United States Patent [19]

Terui et al.

[11] 4,342,054

[45] Jul. 27, 1982

[54] INFORMATION READ DEVICE

[75] Inventors: Nobuo Terui, Hino; Kozo Kobayashi, Kodaira, both of Japan

[73] Assignee: Nakamichi Corporation, Tokyo, Japan

[21] Appl. No.: 155,783

[22] Filed: Jun. 2, 1980

[30] Foreign Application Priority Data

Jun. 6, 1979 [JP] Japan .................... 54-76765[U]

[51] Int. Cl.$^3$ .................... G11B 5/09; G11B 5/02
[52] U.S. Cl. .................... 360/40; 360/46; 360/67
[58] Field of Search .................... 360/40, 43, 46, 67

[56] References Cited

U.S. PATENT DOCUMENTS

| | | | |
|---|---|---|---|
| 3,581,297 | 5/1971 | Behr et al. | 360/40 |
| 3,715,738 | 2/1973 | Kleist et al. | 360/40 |
| 3,852,809 | 12/1974 | Coker, Jr. | 360/40 |
| 3,947,876 | 3/1976 | Gray | 360/40 |

*Primary Examiner*—Vincent P. Canney
*Attorney, Agent, or Firm*—Pearne, Gordon, Sessions, McCoy & Granger

[57] ABSTRACT

This invention relates to an information read device for reading the information of a coded AC signal. The information read device for reading the information of a coded AC signal, wherein a bit "1" is represented by one cycle of an AC signal and a bit "0" is represented by an absence of said AC signal, comprises a first square wave converter to generate a first square wave signal corresponding to positive components of said coded AC signal, a second square wave converter to generate a second square wave signal corresponding to negative components of said coded AC signal, and gate means to selectively pass one of said first and second square wave signals so that said first square wave signal is passed when said AC signal of said coded AC signal begins with a negative component while said second square wave signal is passed when said AC signal of said coded AC signal begins with a positive component, comprising means to modify said coded AC signal so that said information is read out on a level of negative component of said coded AC signal when it begins at a positive polarity and on a level of positive component of said coded AC signal when it begins at a negative polarity.

2 Claims, 3 Drawing Figures

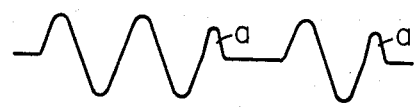
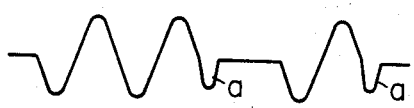
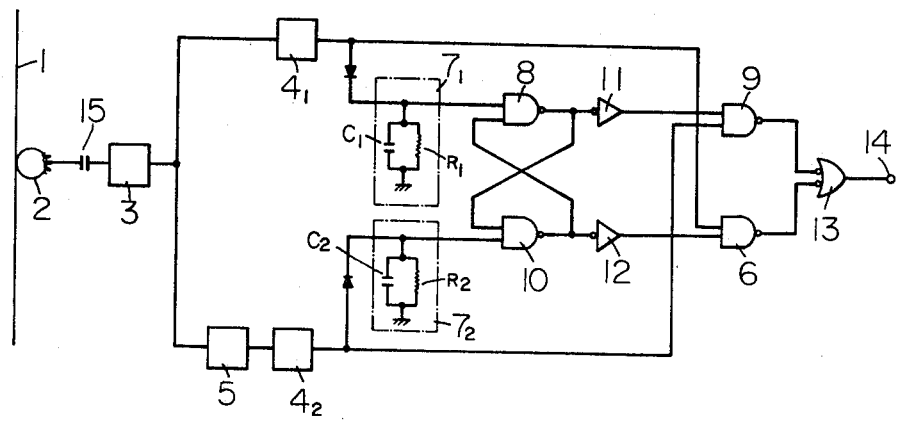

4,342,054

INFORMATION READ DEVICE

BACKGROUND OF THE INVENTION

There has been proposed a magnetic recording and reproducing apparatus which is provided with a heading coded AC signal information read device. In such a heading device, a coded AC signal is recorded at each head position of programs on the magnetic tape. The coded AC signal consists of a combination of binary values in which a bit "1" is represented by one cycle of an AC signal of low frequency range while a bit "0" is represented by an absence of the AC signal. The coded AC signal is read out by detecting either of the polarities of the AC signal. However, following the bit "1", the reproduced output tends to include an undesired component at the position corresponding to the non-recorded portion of the bit "0" due to a phase delay of harmonic in the course of recording and reproducing. FIGS. 1a and 1b show two types of coded AC signals in which reference numerals a designate the undesired component of the reproduced outputs. As noted from these figures, the undesired component is of positive polarity when the AC signal component which is recorded or written on the bit "1" begins at the positive polarity, while the undesired component is of negative polarity when the AC signal component begins at the negative polarity. Thus, it will be noted that the undesired component is of the same polarity as that of the first half-cycle of the AC signal. In the prior device, since the level of the AC signal is detected at either of the polarities of the AC signal, the undesired component a may be read out as a bit "1". Thus, the information is disadvantageously read out in an erroneous manner.

SUMMARY OF THE INVENTION

Accordingly, it is a principal object of the invention to provide an information read device wherein an information of coded AC signal can be correctly read out although the coded AC signal includes an undesired component at its reproduction.

In accordance with the invention, there is provided an information read device for reading the information of a coded AC signal wherein a bit "1" is represented by one cycle of an AC signal and a bit "0" is represented by an absence of said AC signal comprising a first square wave converter to generate a first square wave signal corresponding to positive components of said coded AC signal, a second square wave converter to generate a second square wave signal corresponding to negative components of said coded AC signal, and gate means to selectively pass one of said first and second square wave signals so that said first square wave signal is passed when said AC signal of said coded AC signal begins with a negative component while said second square wave signal is passed when said AC signal of said coded AC signal begins with a positive component, comprising means to modify said coded AC signal so that said information is read out on a level of negative component of said coded AC signal when it begins at a positive polarity and on a level of positive component of said coded AC signal when it begins at a negative polarity.

BRIEF DESCRIPTION OF THE DRAWING

The above and other objects and features of the invention will be apparent from the description of the embodiment of the invention taken with reference to the accompanying drawing in which;

FIGS. 1a and 1b show two different AC signals for information in their waveform;

FIG. 2 is a schematic diagram of an information read device constructed in accordance with one embodiment of the invention;

FIGS. 3a to 3d show an information, a coded AC signal and two modified signals which are used for illustrating the operation of the invention.

DETAILED DESCRIPTION OF THE EMBODIMENT

Referring now to FIG. 2, there is shown an information read device which is constructed in accordance with one embodiment of the invention and which may be applied for heading any one of the audible signals in a magnetic tape recorder. A coded AC signal may be recorded or written at each head position of an audio program on one of two left and right channels of a magnetic tape 1, as a simplified illustration of the invention. The coded AC signal is recorded at 5 Hz which is out of audio frequency range. The coded AC signal on the magnetic tape 1 is reproduced by a reproducing head 2 and applied through a coupling capacitor 15 and a 5 Hz band-pass filter 3 to a first square wave converter $4_1$ and also through an inverter 5 to a second square wave converter $4_2$. An output signal from the first square wave converter $4_1$ is applied directly to a first input of a NAND gate 6 and also to a first input of a NAND gate 8 through a conventional time constant circuit $7_1$ which includes a capacitor $C_1$ and a resistor $R_1$. An output signal from the second square wave converter $4_2$ is applied directly to a first input of a NAND gate 9 and also to a first input of a NAND gate 10 through a time constant circuit $7_2$ which includes a capacitor $C_2$ and a resistor $R_2$. The output of the NAND gate 8 is connected directly to a second input of the NAND gate 10 and also through an inverter 11 to a second input of the NAND gate 9 while the output of the NAND gate 10 is connected directly to a second input of the NAND gate 8 and also through an inverter 12 to a second input of the NAND gate 6. Outputs of the NAND gates 6 and 9 are connected to inputs of a NAND gate 13, respectively, the output from which is picked up from an output terminal 14. The output terminal 14 may be connected to a memory circuit, not shown, to memorize the information of the coded AC signal therein.

The operation of the information read device of FIG. 2 will be described with reference to FIG. 3 hereinafter. The "high" or "low" level condition of the coded signal will be referred to as "Hi" or "Lo" in the description. As shown in FIG. 3a, the information in digital form is supposed to have 4 bits "1100", for example. If the coded AC signal is reproduced to generate a reproduced AC output S which begins at a positive polarity as shown in FIG. 3b, then it includes an undesired component a at the position where the bit is to be "0" as aforementioned. The reproduced AC output S is converted by the first square wave converter $4_1$ into a first square wave signal $S_1$ as shown in FIG. 3c which corresponds to the positive component of the reproduced AC output S, and it is inverted by the inverter 5 and then converted by the converter $4_2$ into a second square wave signal $S_2$ as shown in FIG. 3d which corresponds to the negative component of the reproduced AC output S. It should be noted that the first square wave signal $S_1$ includes a component $a'$ which is based on the undesired component $a$ while the second square wave signal $S_2$ never includes such a component $a'$. The time constant circuits $7_1$ and $7_2$ have the same characteristics as each other and are so set in their capacitances and resistances that the charged voltages of the capacitors never become less than a predetermined value over the time responding to the pulse width of the first and second square wave signals $S_1$ and $S_2$.

In the initial condition of no output from the magnetic reproducing head 2, the NAND gates 8 and 10 are "Lo" at their first inputs so that the outputs of them are "Hi". When the first input of the NAND gate 8 becomes "Hi" in response to the leading positive polarity of the reproduced AC output S, the output of the NAND gate 8 becomes "Lo". Since the input of the time constant circuit $7_1$ is kept at "Hi" during the continuation of the bit "1", the "Lo" condition of the output of the NAND gate 8 is maintained during this period. Since the second input of the NAND gate 10 is "Lo" during this period, the output signal from the NAND gate 10 is "Hi" as initially conditioned even though the second wave signal $S_2$ is applied to the second input thereof. Thus, it will be noted that the NAND gate 9 generates such an output as the second square wave signal $S_2$ applied to the second input thereof is inverted because the first input of the NAND gate 9 is "Hi" during the continuation of the bit "1", while the NAND gate 6 generates an output of "Hi" as initially conditioned even though the second square wave signal $S_1$ is applied to the first input of the NAND gate 6 because the second input of the NAND gate 6 is "Lo" during the continuation of the bit "1". As a result, such an output signal as the output signal from the NAND gate 9 is inverted or as has the same waveform as the square wave signal $S_2$ is generated at the output of the NAND gate 13. It should be noted that the resultant output signal having the same waveform as the second square wave signal $S_2$ including no undesired component is generated at the output terminal 14 even though the output signal from the NAND gate 8 is unduly generated for a long time due to the undesired component $a'$ of the square wave signal $S_1$ during the period of the bit "0" following the bit "1" of the coded signal. Thus, it will be understood that the correct information "1100" can be read from the reproduced output signal including the undesired component $a$.

If the reproduced AC output signal S begins at a negative polarity which is reverse to the reproduced output signal of FIG. 3a, then the undesired component $a$ is also at a negative polarity. In this case, a square wave signal having no undesired component which is generated by the first square wave converter $4_1$ in response to the positive component of the coded AC signal is applied to the first inputs of the NAND gates 6 and 8 while the square wave signal having the undesired component which is generated by the second square wave converter $4_2$ in response to the negative component of the coded AC signal is applied to the first inputs of the NAND gates 9 and 10. As a result, it will be noted that during the period of the bits "1" the output signal of the NAND gate 10 is "Lo" while the output signal of the NAND gate 8 is "Hi" as initially conditioned. Thus, it will be noted that the resultant output signal having the same waveform as the square wave signal including no undesired component from the first square wave converter $4_1$ is generated at the output terminal 14 through the NAND gates 6 and 13. In this manner, the correct information can be read from the reproduced output signal.

In any case, the audible signals on the magnetic tape can be positively headed by correctly reading the respective heading signals written ahead of the audible signals.

Although, in the above embodiment, the coded signal recorded on only one of the left and right channels is read out by the device, the coded signals may be recorded at the two channels in the same or reverse phase. In this case, the coded signals may be preferably additionally or substractively operated after their reproduction so as to enlarge the output level and then read out.

While one preferred embodiment of the invention has been illustrated and described with reference to the accompanying drawing, it will be understood that it is by way of example, and that various changes and modifications may be made without departing from the spirit and scope of the invention which is intended to be defined only by the appended claims.

What is claimed is:

1. An information read device for reading the information of a coded AC signal wherein a bit "1" is represented by one cycle of an AC signal and a bit "0" is represented by an absence of said AC signal comprising:
    a first square wave converter to generate a first square wave signal corresponding to positive components of said coded AC signal;
    a second square wave converter to generate a second square wave signal corresponding to negative components of said coded AC signal; and
    gate means to selectively pass one of said first and second square wave signals so that said first square wave signal is passed when said AC signal of said coded AC signal begins with a negative component while said second square wave signal is passed when said AC signal of said coded AC signal begins with a positive component.

2. An information read device as set forth in claim 1, and wherein said gate means comprises a first NAND gate having one of inputs to which said first square wave signal is applied, a second NAND gate having one of inputs to which an output signal from said first NAND gate is applied and the other input to which said second square wave signal is applied, an output signal from said second NAND gate being applied to the other input of said first NAND gate, a third NAND gate having one of inputs to which said output signal from said first NAND gate is applied after being inverted and the other input to which said second square wave signal is applied, a fourth NAND gate having one of inputs to which said first square wave signal is applied and the other input to which said output signal from said second NAND gate is applied after being inverted, and a fifth NAND gate having inputs to which output signals from said third and fourth NAND gates are applied, respectively.

* * * * *